United States Patent
Wang

(10) Patent No.: US 10,367,230 B2
(45) Date of Patent: Jul. 30, 2019

(54) BATTERY PACKET

(71) Applicant: Tsung-Chi Wang, Taipei (TW)

(72) Inventor: Tsung-Chi Wang, Taipei (TW)

( * ) Notice: Subject to any disclaimer, the term of this patent is extended or adjusted under 35 U.S.C. 154(b) by 413 days.

(21) Appl. No.: 14/974,156

(22) Filed: Dec. 18, 2015

(65) Prior Publication Data

US 2016/0190652 A1   Jun. 30, 2016

(30) Foreign Application Priority Data

Dec. 31, 2014   (TW) .............................. 103146702 A

(51) Int. Cl.
| *H01M 10/0568* | (2010.01) |
| *H01M 10/42* | (2006.01) |
| *H01M 4/38* | (2006.01) |
| *H01M 4/583* | (2010.01) |
| *H02J 7/00* | (2006.01) |
| *H01M 4/40* | (2006.01) |
| *H01M 4/66* | (2006.01) |
| *H02J 7/34* | (2006.01) |

(52) U.S. Cl.
CPC ....... *H01M 10/0568* (2013.01); *H01M 4/405* (2013.01); *H01M 4/583* (2013.01); *H01M 4/661* (2013.01); *H01M 10/4264* (2013.01); *H02J 7/007* (2013.01); *H02J 7/345* (2013.01)

(58) Field of Classification Search
CPC ............. H01M 10/0568; H01M 4/583; H01M 10/4264; H01M 4/405; H01M 4/661; H02J 7/007; H02J 7/345
See application file for complete search history.

(56) References Cited

U.S. PATENT DOCUMENTS

| 2003/0134203 A1* | 7/2003 | Fan ........................ H01M 4/13 429/245 |
| 2010/0123352 A1* | 5/2010 | Elleman ................ H02J 7/0063 307/66 |
| 2010/0233548 A1* | 9/2010 | Pijnenburg .............. H01M 4/13 429/322 |
| 2011/0188172 A1* | 8/2011 | Haight ................... H01G 9/004 361/503 |
| 2012/0231337 A1* | 9/2012 | Miyata ....................... C08J 3/05 429/217 |
| 2013/0236781 A1* | 9/2013 | Oguni ................... H01M 4/622 429/211 |
| 2014/0273890 A1* | 9/2014 | Huang .............. H01M 10/0436 455/90.2 |
| 2015/0213967 A1* | 7/2015 | Yokouchi .............. H01M 4/366 429/211 |
| 2015/0299852 A1* | 10/2015 | Ozkan ....................... H01G 9/20 136/255 |
| 2016/0076156 A1* | 3/2016 | Albrecht ................... C25B 3/06 205/427 |
| 2016/0240326 A1* | 8/2016 | Fischel ................. H01M 4/133 |
| 2017/0201120 A1* | 7/2017 | Lisini ........................ H02J 7/34 |
| 2017/0373338 A1* | 12/2017 | Teranishi ................ H01M 2/16 |

* cited by examiner

*Primary Examiner* — Muhammad S Siddiquee
(74) *Attorney, Agent, or Firm* — Sinorica, LLC

(57) ABSTRACT

A battery packet includes a first electrode, a second electrode, as well as a dielectric layer and an electrolysis material that are disposed between the first and second electrode. The electrolysis material can be NaCl or $CF_6Li$.

11 Claims, 16 Drawing Sheets

BATTERY PACKET

BACKGROUND OF THE INVENTION a) Field of the Invention

The present invention relates to a battery packet.

b) Description of the Prior Art

Most of the batteries now on the market are a lead-acid battery or nickel-iron battery. However, the required recharging time is very long and therefore users often take the battery out of the recharger for use before the battery is fully recharged, which will shorten the time for electric energy supply by the battery and cause inconvenience in using the battery.

SUMMARY OF THE INVENTION

Accordingly, the primary object of the present invention is to disclose a battery packet that can be recharged more quickly.

In accordance with a feature of the present invention, the battery packet includes a first electrode, a second electrode, as well as a dielectric layer and an electrolysis material that are disposed between the first and second electrode, wherein the electrolysis material can be NaCl or $CF_6Li$.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
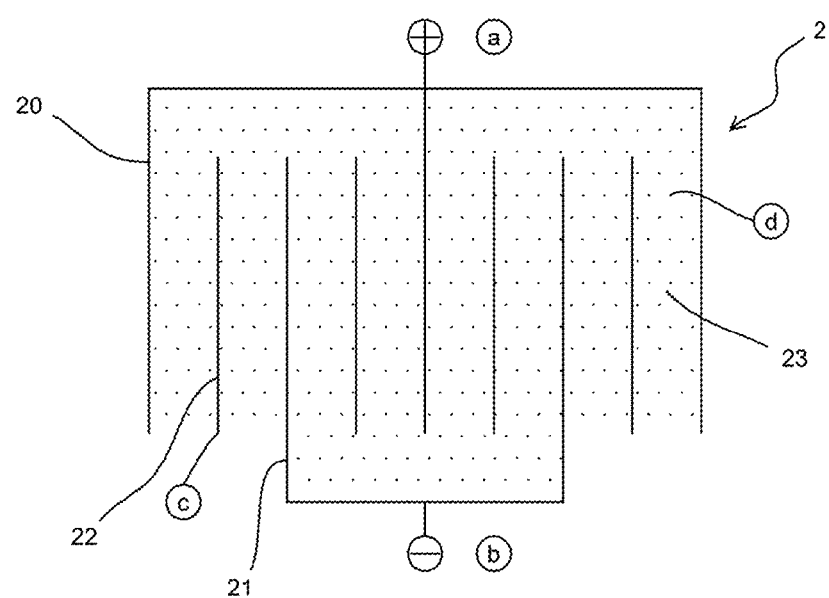
FIG. 1 shows a schematic view of a first preferred embodiment of a battery packet, according to the present invention.

In the detailed description of the preferred embodiments of the present invention hereinafter, the same or similar elements are indicated by the same reference numerals, and detailed description thereof will be omitted. In addition, in order to clearly reveal the features of the present invention, elements in the drawings are not drawn to scale according to the actual.

FIG. 1 discloses a schematic view of a first preferred embodiment of a battery packet 2, according to the present invention. As shown in FIG. 1, the battery packet 2 comprises a first electrode 20 made of Cu and a second electrode 21 made of Al. Between the first electrode 20 and the second electrode 21 is provided with a dielectric layer or dielectric membrane 22 for performing ion exchange. The battery packet 2 can be further injected with a liquid or solid electrolysis material 23 to conduct ion exchange or displace holes and electrons; whereas the electrolysis material 23 can be a liquid or solid material, such as NaCl or $CF_6Li$.

The electrodes 20, 21 and the dielectric layer 22 are formed by printing with metallic powder (such as Al, Cu, C or Ag, etc.) mixed with earth rubber. The dielectric layer (ion exchange layer) 22 is formed between the anode and the cathode by printing with nano or micro powder, such as $BaTiO_3$, $BaTiAl_2O_3$, mixed with earth rubber made of other material.

After the first and second electrodes 20, 21 as well as the dielectric layer 22 have formed a multilayer ceramic capacitor (MLCC), they can be injected with electrolyte (such as $CF_6Li$ or NaCl, etc.). However, it is also acceptable to not inject the electrolyte.

When the first and second electrodes 20, 21 as well as the dielectric layer 22 constitute the MLCC and then use high-temperature de-binding to result in a porous MLCC made of the first and second electrodes 20, 21 as well as the dielectric layer 22, a fully rechargeable battery is formed with or without injecting the electrolyte.

It is to be noted that the structure in FIG. 1 is a single-layered structure. However, the battery packet 2 of the present embodiment can be provided with plural overlapped single-layered structures, meaning that the single-layered structure in FIG. 1 is connected electrically in series or in parallel or both.

Figure 2:
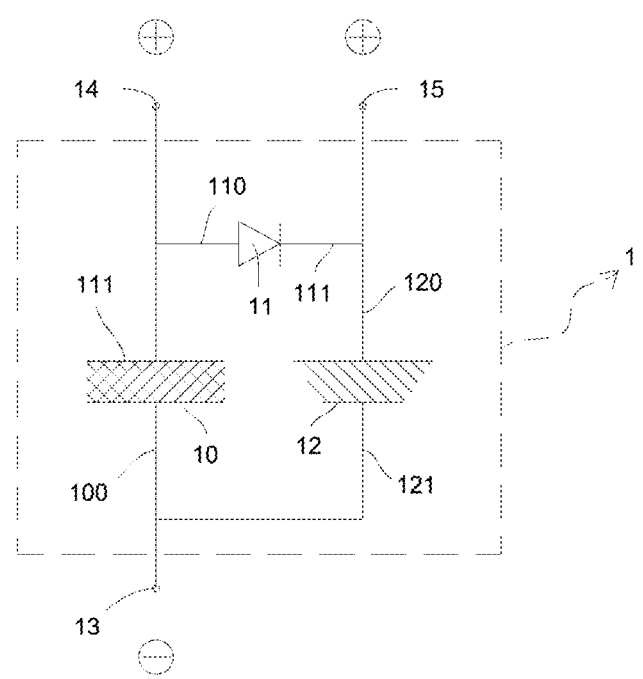
FIG. 2 shows a structural view of a second preferred embodiment of the battery packet, according to the present invention.

FIG. 2 discloses a structural view of a second preferred embodiment of the battery packet, according to the present invention.

As shown in FIG. 2, in addition to the battery structure in FIG. 1, the battery packet 1 of the present embodiment also comprises a capacitor 10 and a diode 11.

The battery packet 1 includes a first electrode 20 and a second electrode 21. The capacitor 10 is provided with a first electrode 100 which is connected electrically with the second electrode 21, and a second electrode 101 which is connected electrically with the first electrode 20.

In addition, the diode 11 is provided with an anode 110 which is connected electrically with the second electrode 101 of the capacitor 10, as well as a cathode 111 which is connected electrically with the first electrode 20.

When the battery packet 1 is being recharged, the first electrode 20 and the second electrode 21 of the battery packet 1 are connected electrically with a recharging device (not shown in the drawing), so that the capacitor 10 and the battery are being recharged at a same time. As the capacitor 10 can be fully recharged quickly, e.g., in 10 min., the recharging device can be disconnected from the battery packet 1 after accomplishing the recharging to the capacitor 10. Therefore, the capacitor 10 can start to discharge and the battery can be recharged continuously. Accordingly, the battery packet 1 is movable, thereby increasing convenience in using the battery.

Figure 7:
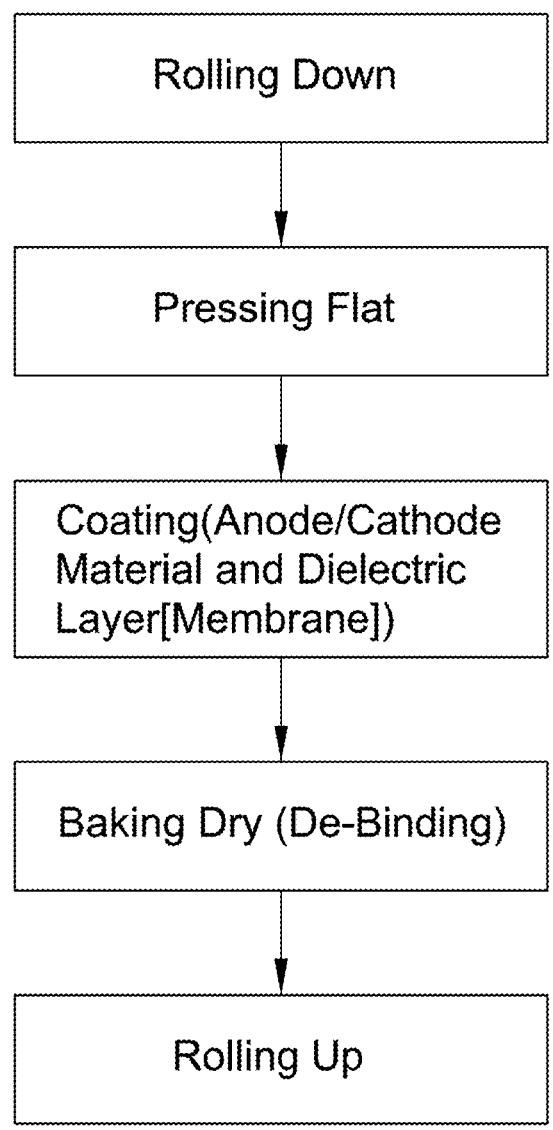
FIG. 7 shows a flow diagram of making an anode and a cathode.

The electrodes 20, 21 can be formed by printing with copper or aluminum foils or nano or micro metallic powder mixed with earth rubber, and are then sintered in high temperature. The thickness formed is between 10 nm and 10 mm. It is to be noted that in addition to that the anode and cathode can be made of copper, aluminum or other metal, they can also be made of a non-metallic conductive material, and can be made roll-to-roll to facilitate being folded into multiple layers. The manufacturing process is disclosed in FIG. 7.

On the other hand, the first and second electrodes can be stamped and then stacked into an MLCC, or the first and second electrode materials can be rolled into a cylinder and then injected with the electrolyte (ion-exchange fluid such as $CF_6Li$ or NaCl).

On the other hand, metallic powder and porous non-metallic powder can be used to form the first and second porous conductive electrode plates.

On the other hand, the porous electrode plates can be coated with carbon, graphene or an anode material such as LiCo, LiPFe or LiMn.

The chemical formulae of the electrolyte are:

$LiCo \rightarrow ^{-2}Li$ moving to an anode Cu or a cathode Cu, and Co moving to the anode copper, forming ion exchange;

$NaCl \rightarrow ^{+2}Na$ moving to an anode Cu or a cathode Cu, and Cl ions moving to an anode Al or a cathode Al.

The anode and the cathode can be also coated with an anode material such as LiCo, LiPFe or LiMn. The cathode material is carbon and the electrode plate is made of aluminum, copper or other metal or non-metallic material, such as carbon, graphite or graphene.

PVDF (polyvinylidene difluoride) or an ion-exchange membrane can be added between the anode and the cathode. The anode plate and the cathode plate can be printed with the ion-exchange membrane which is made of $BaTiO_3$ and PVDF or $BaTiO_3$ mixed with earth rubber, and is printed on the metallic anode and cathode electrode plates of copper, aluminum or silver.

The dielectric material such as $BaTiO_3$ or $BaAl_2O_3$, PVDF or earth rubber mixed with other materials is used to form the ion-exchange membrane.

The ion-exchange membrane enables ion exchange to occur between the positive and negative ions as well as between the holes and electrons on the anode and the cathode, or the holes and electrons to be displaced, so as to repeat a recharging or discharging cycle at the anode/cathode end.

Figure 9A:
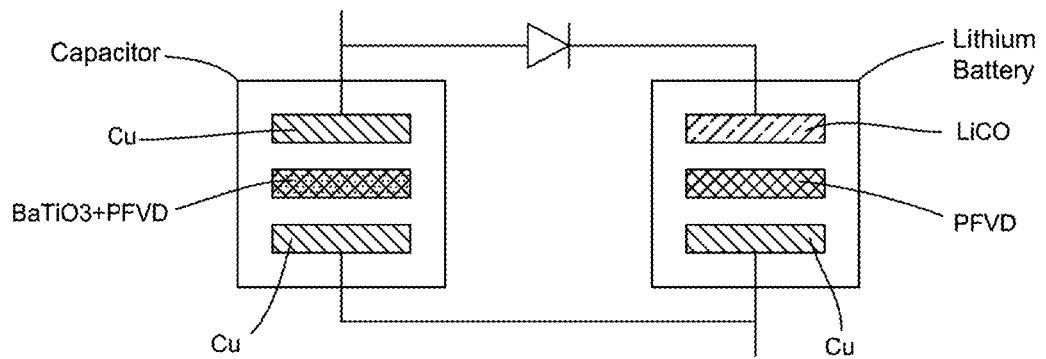
FIG. 9A shows a schematic view of an electric charging and discharging loop formed by a lithium battery and a barium titanate lithium oxide cell being made into a same pack or a separate pack added with a diode.

It is to be noted that a lithium battery and a barium titanate lithium oxide cell can be made into a same pack or a separate pack added with a diode, thereby forming a charging and discharging loop, as shown in FIG. 9A.

Figure 9B:
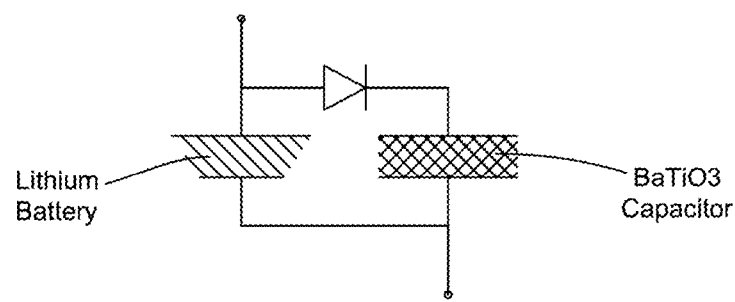
FIG. 9B shows a schematic view of that two ends of the diode in FIG. 9A are switched with each other.

Two ends of the diode can be switched with each other, as shown in FIG. 9B.

Figure 3:
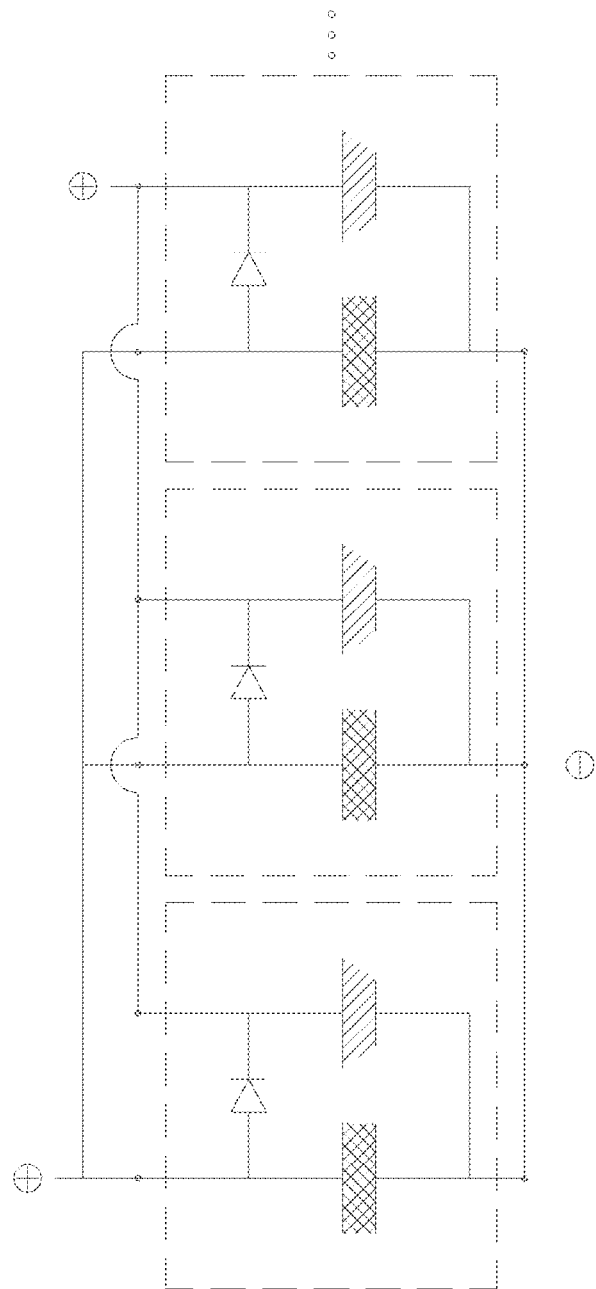
FIG. 3 shows a schematic view of a power supply system which uses plural battery packets 1 as shown in FIG. 2.

FIG. 3 discloses a schematic view of a power supply system which uses plural battery packets 1 as shown in FIG. 2.

As shown in FIG. 3, the battery packets 1 are connected in parallel to achieve a high current output.

Figure 4:
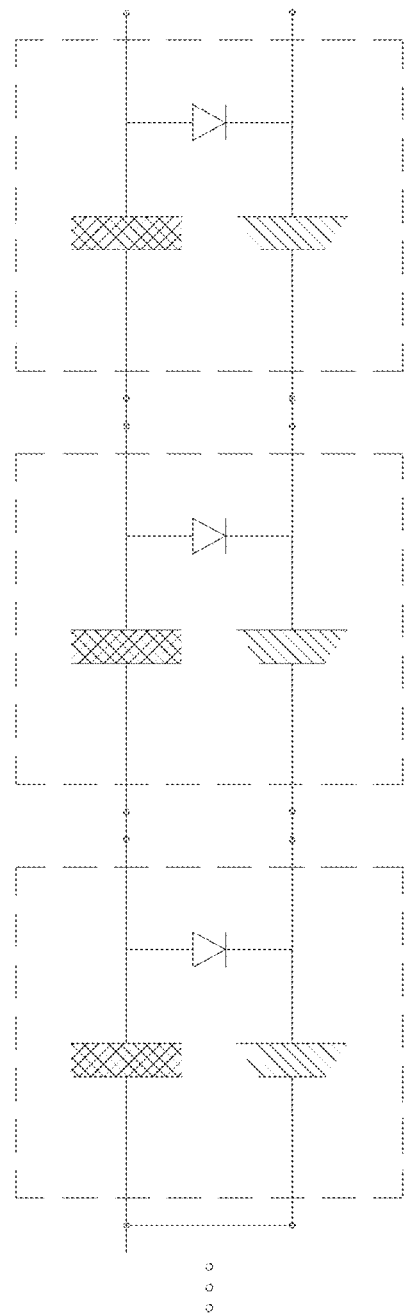
FIG. 4 shows a schematic view of another power supply system which uses plural battery packets 1 as shown in FIG. 2.

FIG. 4 discloses a schematic view of another power supply system which uses plural battery packets 1 as shown in FIG. 2.

As shown in FIG. 4, the battery packets 1 are connected in series to achieve a high voltage output.

Figure 5:
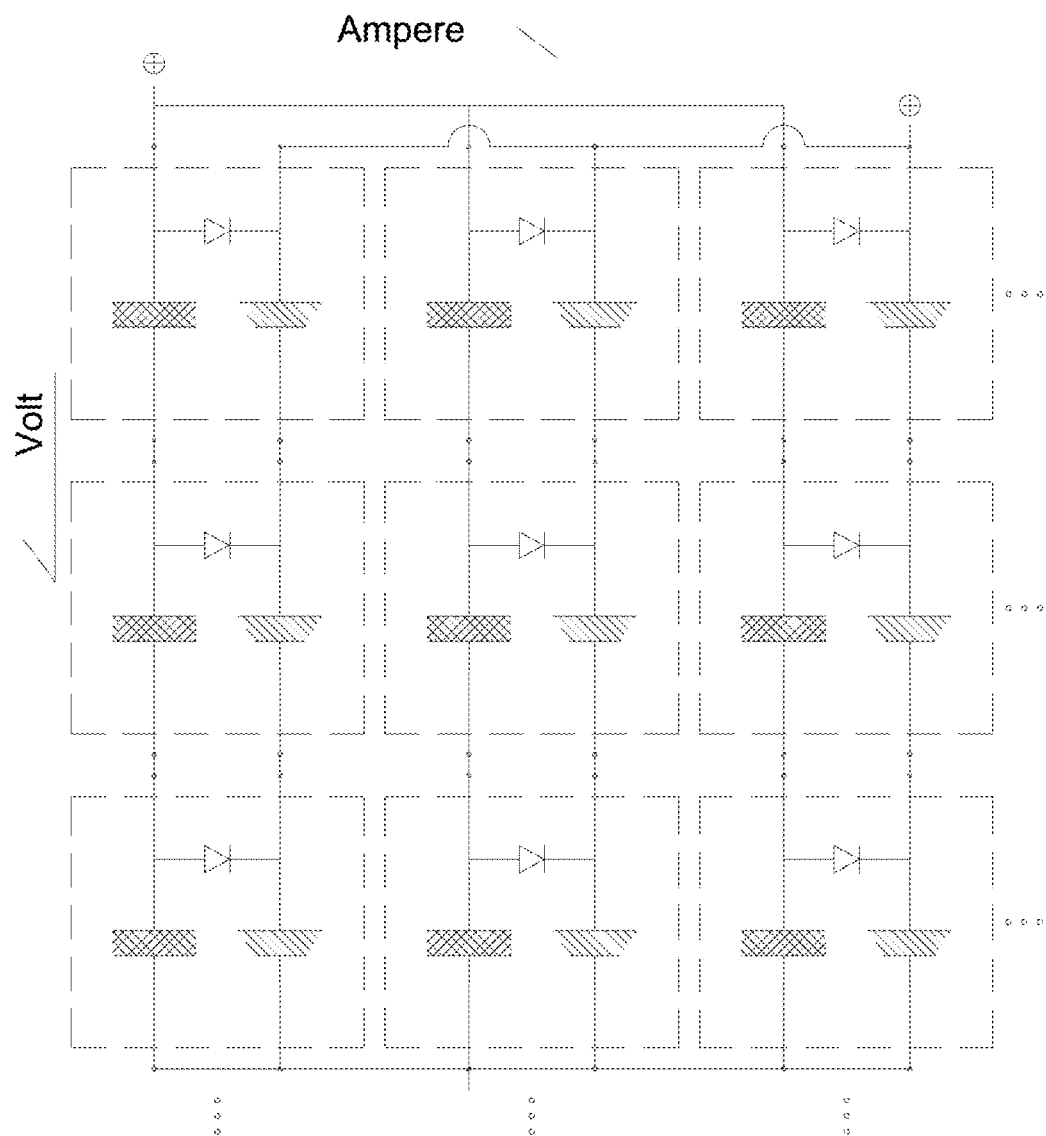
FIG. 5 shows a schematic view of a power supply system which uses plural battery packets 2 as shown in FIG. 1.

FIG. 5 discloses a schematic view of a power supply system which uses plural battery packets 2 as shown in FIG. 1.

As shown in FIG. 5, the battery packets 2 are connected both in parallel and in series to achieve a high voltage output and a high current output.

Figure 6:
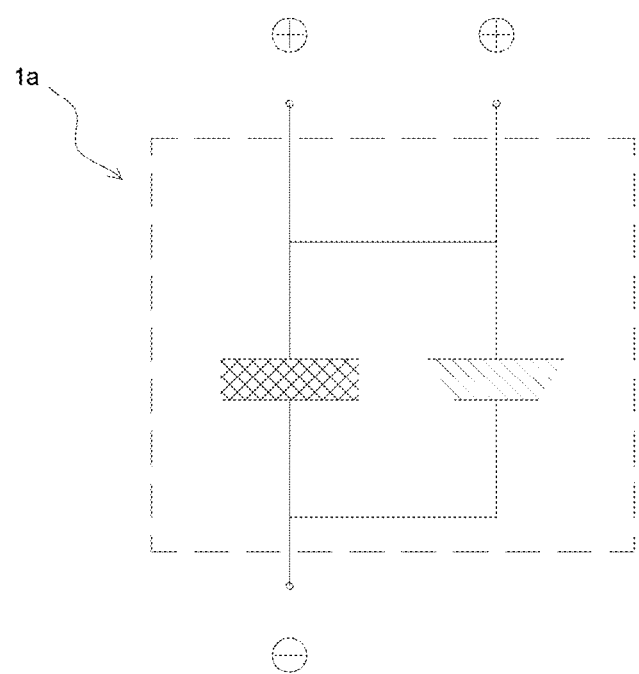
FIG. 6 shows a structural view of the second preferred embodiment of the battery packet 1a, according to the present invention.

FIG. 6 discloses a structural view of a second preferred embodiment of the battery packet 1a, according to the present invention.

The difference between the embodiment in FIG. 6 and the embodiment in FIG. 2 is that the battery packet 1a does not include the diode.

Figure 8:
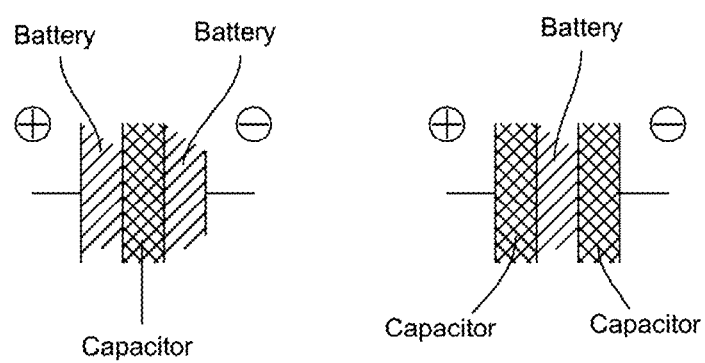
FIG. 8 shows a schematic view of that capacitors and batteries form a serial connection in one body or a parallel connection in one body.

FIG. 8 discloses that the capacitors and the batteries form a serial connection in one body or parallel connection in one body. The LiCo, LiMn, LiPFe lithium battery can be added with $BaTiO_3$, NaCl or other material of a capacitor battery, thereby forming the serial connection in one body or the parallel connection in one body.

The porous anode and cathode are formed as follows. The porous ceramic anode and cathode plates are coated with PVDF or electroplated with a metallic or non-metallic material such as Al, Cu, and carbon.

The ion-exchange membrane is formed as follows. The dielectric material $BaTiO_3$ or $BaAl_2O_3$, PVDF or earth rubber is coated on the anode and cathode plates by printing, and is then bonded with the electrode plates to form the ion-exchange membrane.

When the porous electrode plates are submerged and suspended in liquid, the electrolyte in the liquid can conduct electricity and ionize the liquid, facilitating the exchange between positive ions and negative ions or the displacement of and exchange between holes and electrons. The electrolyte is an ordinary liquid electrolyte such as NaCl (brine), $CF_6Li$, or lithium hexacarbonyl.

For printing and stacking of porous multilayer structures (from one layer to more than 10,000 layers of, such as the anode, the dielectric layer, PVDF, the cathode, the anode, . . . ), it can be all acceptable to stack three layers onto one layer or 100,000 layers, repeatedly. After stacking, the earth rubber in the three layers and in the stack is expelled out by high temperature de-binding in 50° C. to 1,000° C., leaving behind the anode and cathode conductive materials and the dielectric material to form a thinner battery structure.

The NaCl crystals are added into the dielectric layer made of $BaTiO_3$ and PVDF or made of the earth rubber, and when the dielectric material generates high temperature in 100° C. to 500° C. during recharging, the NaCl crystals will turn into the liquid phase from the solid phase, which will enclose and insulate the positive/negative ions and the colloids of ion exchange in the $BaTiO_3$ crystals, thereby increasing the internal resistance from 1 M to 10 M or above to result in a capacitor which becomes a battery for storing electricity.

In the dielectric layer, when the $BaTiO_3$ particles are enclosed by the NaCl crystals to discharge electricity, a three-phase change is formed, which activates the ferroelectricity and hysteresis discharging (or recharging) of the $BaTiO_3$ to generate current and form a battery feature.

In recharging, an electrolysis phenomenon will occur in the NaCl solution, and the chemical formulae at the anode and cathode of copper, aluminum and between the ions of $Na^+$ and $^-Cl$ are:

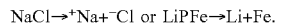

$NaCl \rightarrow ^+Na + ^-Cl$ or $LiPFe \rightarrow Li+Fe$.

The ions of $^+Na$ and $^-Cl$, which are undergoing electrolysis, activate the ferroelectricity and hysteresis effect of displacing electrons and holes of the $BaTiO_3$ to store electric energy, when the ions pass through the dielectric layer made of $BaTiO_3$ and PVDF.

Figure 10:
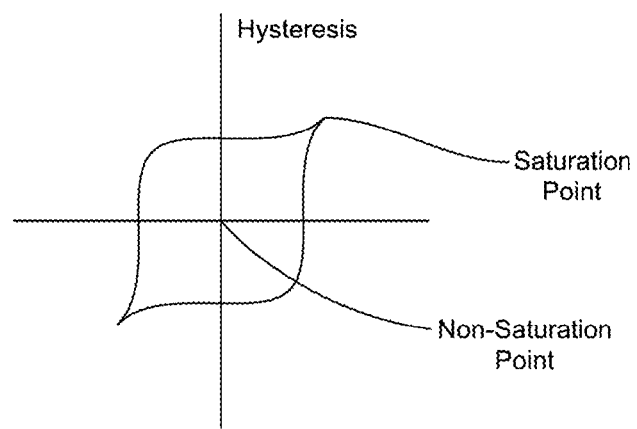
FIGS. 10 to 15 show schematic views of the electric charging characteristics of the battery packet, according to the present invention.
Figure 11:
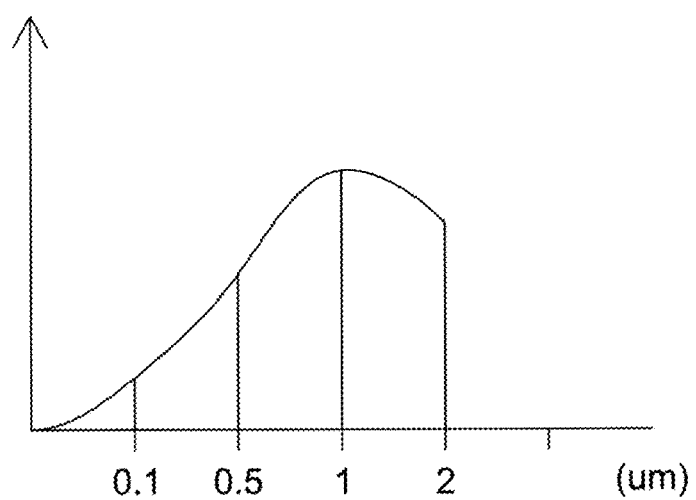

Referring to FIG. 10 and FIG. 11, when the ions of $^+Na$ exchange with the ions of $^-Cl$, the ferroelectricity and hysteresis effect will occur to BaTiO3, resulting in high temperature. After the heat is absorbed by the NaCl crystals that are mixed in the dielectric layer to result in a three-phase change, the NaCl crystals will be liquefied and flow to enclose the $BaTiO_3$ crystals, so that the saturated ferroelectricity and hysteresis effect can be kept in the $BaTiO_3$ crystals after recharging. When the recharging stops, the NaCl crystals which have gone through the three-phase change will be cooled down quickly to enclose the $BaTiO_3$ particles at the optimal saturation point of hysteresis, thereby achieve the function of storing electric energy.

$BaTiO_3$ is the strongest and most explicit within a band of ±1 µm on a hysteresis curve and the present embodiment can be applied to the $BaTiO_3$ particles in a range from 10 nm to 10 µm.

All the three layers (anode, cathode and dielectric layer) can use a nano or micro metallic material and a non-metallic material to achieve a maximum area, and in the smallest dielectric layer, $BaTiO_3$ can have the dielectric constant between DK=1000(1 k) and DK=500 k, with $C=\varepsilon_0 KXA/dt$.

In the dielectric layer, the NaCl crystals, $BaTiO_3$ and the earth rubber can be also not injected with any electrolyte to have the function of a battery.

If the dielectric layer is injected with an electrolyte, such as NaCl with $H_2O$, the recharging speed can be increased and a fast recharging can be achieved when the voltage is between 1 and 6000 VDC and the current is between 1 µA and 1000 A, otherwise the recharging time will be generally between 10 sec to 10 k sec.

Figure 12:
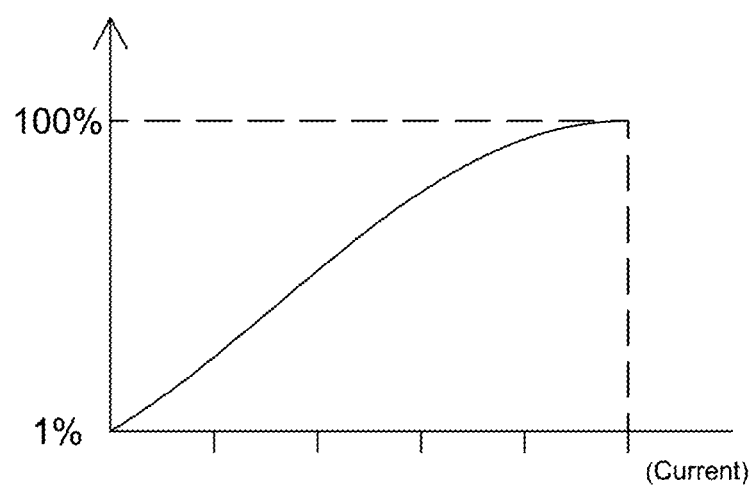

As shown in FIG. 12, it is to be noted that the NaCl electrolyte is positively proportional to recharging and storage of electric energy in the range of 1% to 100% of the specific weight.

As not being provided with a combustible metal, such as Li, Co, Mn, the battery will not explode nor combust spontaneously in high temperature by any striking or piercing, in a working temperature between −70° C. and 400° C.

Figure 13:
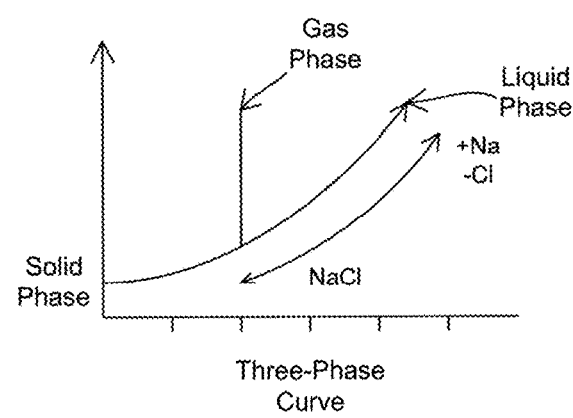
Figure 14:
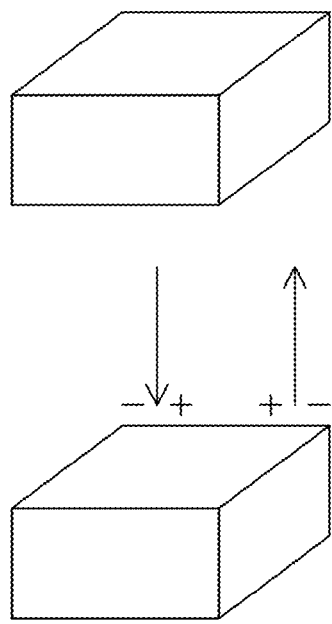

Referring to FIG. 13 and FIG. 14, NaCl is formed with a three-phase change in water of saturated concentration, decomposes into the ions of $^+Na$ and $^-Cl$ after undergoing electrolysis, and then constitutes conducting in three phases. Similarly, when $BaTiO_3$ is recharging, NaCl decomposes at a same time into the ions of $Na^+$ and $^-Cl$ after undergoing electrolysis, allowing the solid-phase NaCl to return to the liquid-phase NaCl, enclosing the $BaTiO_3$ particles. When $BaTiO_3$ is not recharging, on the other hand, a small amount of $^+Na$ and $^-Cl$ will be discharged and neutralized, returning to the solid-phase NaCl crystal to enclose the saturated $BaTiO_3$ crystal and achieve the function of storing electric energy.

When a tetragonal BaTiO3 is recharged, it will become a rectangular crystal and the anode and cathode holes and the electrons will be at two sides of the surface of the crystal. The holes and the electrons discharge and neutralize, recovering the rectangular crystal to the tetragonal crystal. When the hysteresis property of the rectangular crystal achieves saturation to store electric energy, and the rectangular crystal is enclosed (discharging) or not by $^+Na$ and $^-Cl$ or the three-phase change of NaCl, a cyclic function of recharging, storing electric energy and discharging will be repeated.

Figure 15:
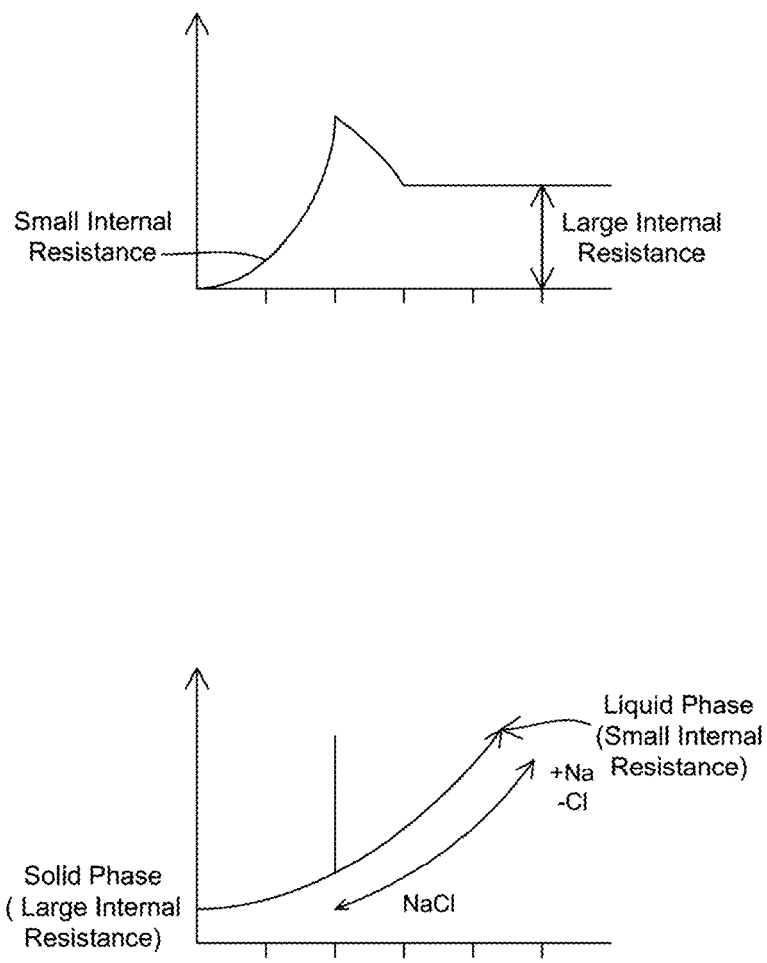

Referring to FIG. 15, it shows a curve of internal resistance controlled by a two-phase change of NaCl. When NaCl is in the liquid phase, the internal resistance is small; whereas, when NaCl is in the solid phase, the internal resistance is large. This forms a two-state on/off function of the battery, wherein when the state is on, a recharging/discharging function is achieved and when the state is off, a function of storing electric energy is achieved.

NaCl (small internal resistance)→$^+Na+^-Cl$ (large internal resistance).

When NaCl is ionized, the internal resistance becomes larger (the state of on) to store electric energy; whereas, when NaCl is neutralized, the internal resistance becomes smaller (the state of off) to recharge/discharge electricity.

Other electrode metal, such as Al, Cu, facilitates the recharging and discharging of electrolysis and Mn, Al, C, Zn facilitates the chemical reaction.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A battery packet comprising:
a first electrode;
a second electrode;
a dielectric layer;
an electrolysis material;
a capacitor having two electrodes connected with the first electrode and the second electrode respectively;
the dielectric layer being disposed in between the first electrode and the second electrode;
the electrolysis material being disposed in between the first electrode and the second electrode;
the electrolysis material being $CF_6Li$ or NaCl;
the first electrode, the second electrode, the dielectric layer and the electrolysis material forming a battery cell and the capacitor being a discrete component placed beside the battery cell and integrated in the battery packet;
in response to the battery packet being recharged, the capacitor being fully recharged; and
in response to the capacitor being fully recharged and then a rechargeable power source being removed, the capacitor discharging so as to recharge the battery cell.

2. The battery packet according to claim 1, wherein the first electrode, the second electrode and the dielectric layer are formed by printing with metallic thin plates or metallic powder selected from the group consisting of Al, Cu, C and Ag mixed with a rubber material, the dielectric layer is formed between an anode and a cathode by printing with nano or micro powder selected from the group consisting of $BaTiO_3$ and $BaTiAl_2O_3$ mixed with another rubber material, or is made into an isolation membrane by adding PVDF or fabric cloth between the anode and the cathode.

3. The battery packet according to claim 1, wherein the first electrode and the second electrode are formed by printing with copper or aluminum foils or nano or micro metallic powder mixed with a rubber material, and are then sintered in high temperature, with the thickness formed being between 10 nm and 1 mm.

4. The battery packet according to claim 1, wherein the first electrode and the second electrode are manufactured by a non-metallic material selected from the group consisting of nano-carbon-tube, graphite, graphene and carbon powder.

5. The battery packet according to claim 1, wherein the first electrode, the second electrode and the dielectric layer are made roll-to-roll to facilitate being folded into multiple layers.

6. The battery packet according to claim 1, wherein the chemical formulae of an electrolyte are:

$LiCo \rightarrow ^{-2}Li$ moving to an anode Cu or a cathode Cu, and Co moving to the anode Al, forming ion exchange;

$NaCl \rightarrow ^{+2}Na$ moving to an anode Cu or a cathode Cu, and Cl ions moving to an anode Al or a cathode Al.

7. The battery packet according to claim 1, wherein an anode is coated with an anode material selected from the group consisting of LiCo, LiPFe and LiMn, and a cathode is coated with a cathode material selected from the group consisting of carbon powder, graphite and graphene.

8. The battery packet according to claim 1, wherein the first electrode and the second electrode are made of a metallic conductive material selected from the group consisting of aluminum and copper, or are made of a non-metallic material selected from the group consisting of carbon, graphite and graphene.

9. The battery packet according to claim 1, wherein an ion exchange membrane, made of $BaTiO_3$ and PVDF or made of $BaTiO_3$ mixed with a rubber material, is printed on an anode plate and a cathode plate.

10. The battery packet according to claim 1, wherein metallic powder and porous non-metallic powder form a first porous conductive electrode plate and a second porous conductive electrode plate.

11. The battery packet according to claim 1, wherein porous electrode plates are coated with carbon, graphene or an anode material.

* * * * *